United States Patent
Foerster et al.

(10) Patent No.: US 9,554,328 B2
(45) Date of Patent: Jan. 24, 2017

(54) VEHICLE-BASED SMALL CELL BASE STATIONS

(71) Applicants: Jeffrey R. Foerster, Portland, OR (US); Xue Yang, Arcadia, CA (US); Omesh Tickoo, Portland, OR (US)

(72) Inventors: Jeffrey R. Foerster, Portland, OR (US); Xue Yang, Arcadia, CA (US); Omesh Tickoo, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 112 days.

(21) Appl. No.: 13/951,883

(22) Filed: Jul. 26, 2013

(65) Prior Publication Data

US 2015/0031372 A1 Jan. 29, 2015

(51) Int. Cl.
*H04W 36/00* (2009.01)
*H04W 48/20* (2009.01)
(Continued)

(52) U.S. Cl.
CPC ............ *H04W 48/20* (2013.01); *H04W 16/00* (2013.01); *H04W 84/005* (2013.01); *H04W 84/045* (2013.01)

(58) Field of Classification Search
CPC .. H04W 84/005; H04W 84/047; H04W 36/32; H04W 88/04; H04W 88/08; H04W 76/02; H04W 36/0083; H04W 88/02; H04W 72/02; H04W 92/02; H04W 88/12; H04W 36/38; H04W 60/00; H04W 92/20; H04W 36/00; H04W 36/0061; H04W 48/04; H04W 48/18; H04W 56/0015; H04W 36/14; H04W 36/20; H04W 40/02; H04W 40/026; H04W 48/10; H04W 4/046; H04W 52/244; H04W 84/045; H04W 36/08; H04W 48/20; H04W 36/30; H04W 16/00; H04B 7/2606; H04B 7/15507; H04B 7/15542; H04B 7/1555; H04B 7/026; H04B 7/15; H04B 7/15535; H04B 7/15592; H04B 10/25753; H04B 7/022

See application file for complete search history.

(56) References Cited

U.S. PATENT DOCUMENTS 8,903,394 B2 * 12/2014 Shen et al. .................... 455/436
2011/0176476 A1 7/2011 Tsuruoka
(Continued)

OTHER PUBLICATIONS

International Search Report and Written Opinion of International Application PCT/US2014/047145 dated Nov. 3, 2014. 13 pages.

*Primary Examiner* — Ajit Patel
(74) *Attorney, Agent, or Firm* — Sutherland Asbill & Brennan LLP

(57) ABSTRACT

Certain embodiments herein are directed to vehicle-based small cell base stations. A vehicle-based base station may include at least one antenna; at least one transceiver coupled to the at least one antenna; at least one memory that stores computer-executable instructions; and at least one processor in communication with the transceiver and configured to access the at least one memory. The processor may be configured to execute the computer-executable instructions to receive data associated with a user device from a base station; receive data from the base station; establish connection with the user device based at least in part on the data received from the macrocell base station; and transmit the data received from the base station to the user device.

19 Claims, 6 Drawing Sheets

(51) Int. Cl.
*H04W 16/00* (2009.01)
*H04W 84/00* (2009.01)
*H04W 84/04* (2009.01)

(56) References Cited

U.S. PATENT DOCUMENTS

| | | |
|---|---|---|
| 2011/0275378 A1* | 11/2011 | Kwon et al. .................. 455/437 |
| 2012/0113843 A1* | 5/2012 | Watfa ................ H04W 72/1289 370/252 |
| 2012/0129532 A1* | 5/2012 | Lim et al. ..................... 455/437 |
| 2012/0280788 A1 | 11/2012 | Nowottnick |
| 2013/0017776 A1* | 1/2013 | Takano et al. .................... 455/7 |
| 2013/0130675 A1* | 5/2013 | Yi ......................... H04W 48/20 455/424 |
| 2013/0145482 A1 | 6/2013 | Ricci et al. |
| 2013/0195005 A1* | 8/2013 | Al-Shalash .................. 370/315 |
| 2014/0071884 A1* | 3/2014 | Sherman ...................... 370/315 |
| 2016/0021581 A1* | 1/2016 | Deenoo ............. H04W 36/0055 370/331 |

* cited by examiner

VEHICLE-BASED SMALL CELL BASE STATIONS

TECHNICAL FIELD

Embodiments of this disclosure relate generally to telecommunication networks, and more particularly, to vehicle-based small cell base stations.

BACKGROUND

With the increasing number of user devices that permit network access from virtually anywhere, the wireless spectrum of a cellular network is becoming a scarce resource that should be utilized efficiently in order to maximize the capacity of the network while meeting the needs of the end-user. A cellular network may include different cell sizes. For example, a macrocell network may include one or more macrocell base stations that may each include a base station antenna installed on a mast or a building above average roof top level. Macrocells generally have a coverage extending to approximately 35 kilometers. Small cell base stations are low-powered radio access nodes that have a range of 10 meters to 1-2 kilometers. Small cell base stations may include picocells, femtocells, and microcells. Microcell base stations are devices whose antenna height is under the average roof top level, are typically used in urban areas and have coverage extending to approximately less than two kilometers. Picocell base stations are devices whose coverage diameter is a few dozen meters and are mainly used indoors. Femtocell base stations are devices designed for use in residential or small business environments and connect to the service provider's network via a broadband internet connection.

The capacity of a cellular network may be directly related to the separation distance between user devices and the serving macrocell base station. As the number of user devices attempting to gain access to a wireless network through the macrocell base stations associated therewith increase, the capacity of the wireless spectrum may decrease. Building additional macrocell base stations to meet the needs of users may be cost prohibitive as it is often costly to build macrocell base stations, along with supporting infrastructure including communication backhaul from the base station to the rest of the network. Additionally, locations of these base stations may be restricted based on feasible site locations and the impact of other buildings in the area. Also, the number of antennas on the user devices is typically limited by the size of the device. Both of these factors make it very difficult and expensive to increase the available capacity of a mobile network.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Figure 1:
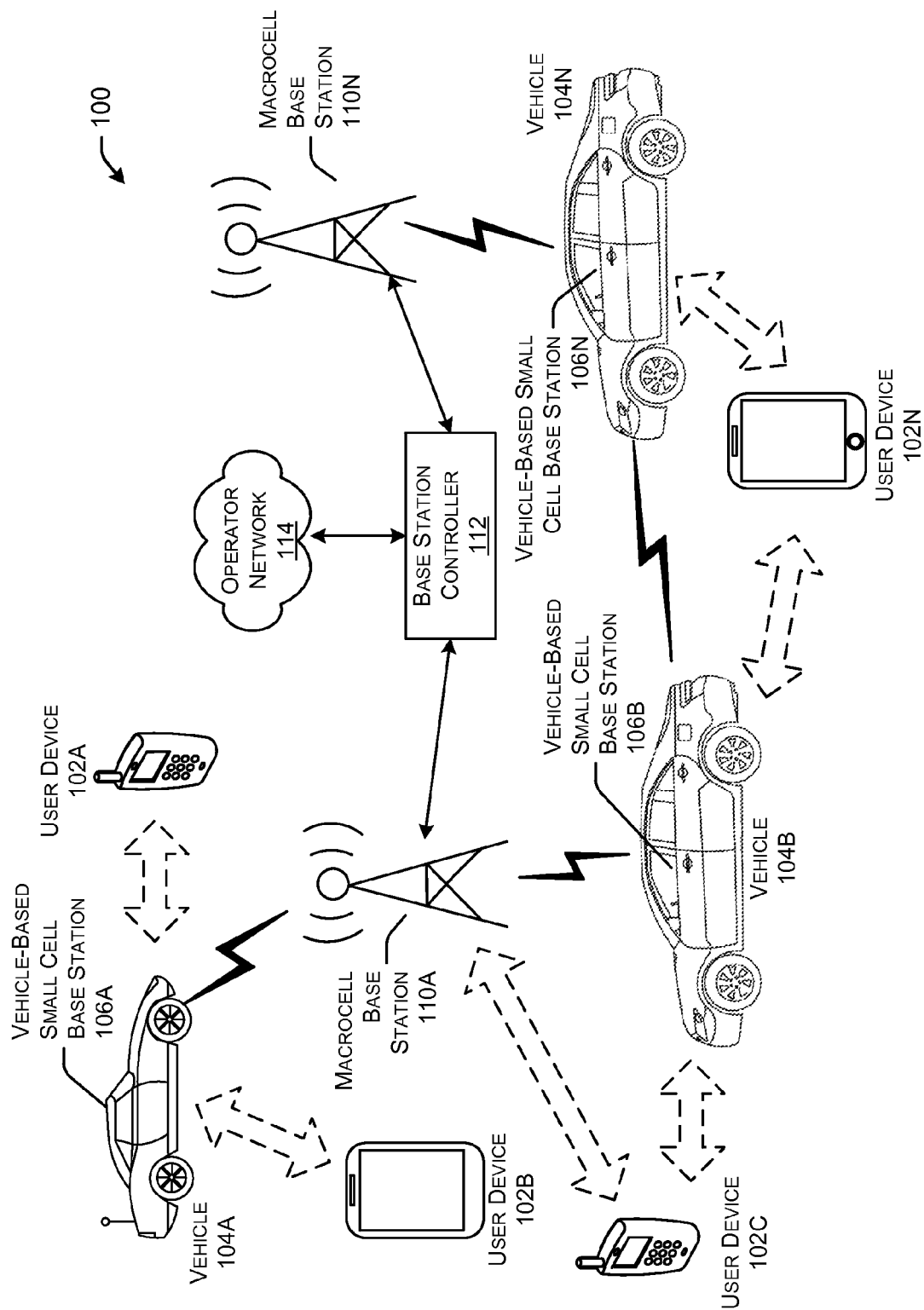
FIG. 1 illustrates an example cellular network infrastructure including one or more vehicle-based small cell base stations, in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein are directed to, among other things, vehicle-based small cell base stations. Vehicles have increased capabilities for communication and data storage. As a result, vehicles equipped with mobile small cell base stations are an untapped resource that could significantly improve wireless network coverage capabilities and cooperate with an associated macrocell network for improving overall network capacity. As user devices, such as mobile devices, become increasingly prevalent, wireless spectrum becomes an increasingly scarce resource that should be utilized efficiently in order to maximize the capacity of the network and satisfy the needs of the user. Vehicles may have a larger number of antennas and are not battery constrained so they can support much higher throughputs to macrocell base stations compared to just the user device. For example, the vehicles may employ multiple-input and multiple-output (MIMO), which is the use of multiple antennas at both the transmitter and receiver to improve communication performance.

In one embodiment, a network service provider may collaborate with a car manufacturer to deploy vehicle-based small cell base stations in cars, which may enable a mobile phone to connect through the vehicle-based small cell base station to communicate with a macrocell base station. The vehicle may provide a mobile small cell (e.g., a femtocell, a microcell, or a picocell) for nearby user devices associated with the network service provider. Ultimately, if multiple vehicles are equipped with vehicle-based small cell base stations and mobile phones inside such vehicles are large consumers of bandwidth, the network capacity may be substantially boosted due to the naturally formed spatial reuse. Vehicles may also coordinate transmissions for optimal capacity, even doing distributed MIMO. In addition, the vehicle could share storage for content to be pre-cached based upon the devices connected to it. The vehicle-based small cell base stations may utilize protocols to discover and connect user devices to the vehicle-based small cell base station or manage hand-offs between macrocell base station and vehicle-based small cell base stations. The vehicle-based small cell base stations may facilitate power control at the vehicle-based small cell base station for optimized cell coverage. The vehicle-based small cell base stations may enable secure handling of content between various devices and/or vehicles and coordinated distributed MIMO algorithms. This could also be a value added service for taxis, buses, or other vehicle-based services (e.g., package delivery services, courier services, etc.).

In an illustrative example, multiple vehicles equipped with vehicle-based small cell base stations may be deployed in different vehicles (e.g., transportation vans, taxis, buses, individual cars, or the like) and may enable connections to nearby user devices. The vehicles may act as either a simple relay, or the vehicle-based small cell base stations may pre-cache content in anticipation of the user device needing that content when it is near (e.g., in anticipation of a handover). The mobile network capacity may be improved by taking advantage of various factors. For example, with the use of vehicle-based small cell base stations, the distance between the vehicle and the user device is significantly smaller than the distance between the user device and macrocell base station. As a result of the smaller distance, the capacity of the link between the user device and the vehicle-based small cell base station may be higher than that of the user device to macrocell base station. The link between the vehicle-based small cell base station and the macrocell base station may be higher quality than the user device to macrocell base station connection, since the vehicle-based small cell base station could provide a larger number of antennas (e.g., more than 8 antennas in the vehicle-based small cell base station as compared to 1-2 antennas available on the user device). Another factor may be that each vehicle-based small cell base station covers a small region surrounding the vehicle. Through effective power control, the network capability may be increased due to spatial reuse. In embodiments, the capacity of the network could be further improved where the vehicle-based small cell base stations are designed to cooperate with each other in handling handovers of mobile connections and obtaining content for the user devices. The vehicle-based small cell base stations may alleviate the problem of relatively bad connection quality in densely populated areas, such as the downtown area of a major city, where the mobile bandwidth is generally operating under strain due to too many users.

FIG. 1 illustrates an example cellular network infrastructure including one or more vehicle-based small cell base stations, in accordance with one or more embodiments of the disclosure. As shown in FIG. 1, one or more user devices (102A-102N, collectively referred to as 102) may communicate with one or more vehicle-based small cell base stations (106A-106N, collectively referred to as 106) and/or one or more macrocell base stations (110A-110N, collectively referred to as 110). The vehicle-based small cell base stations 106 may communicate with other vehicle-based small cell base stations (e.g., 106B and 106N), one or more user devices 102, and/or one or more macrocell base stations 110. The macrocell base stations 110 may communicate with one or more user devices 102 and/or one or more vehicle-based small cell base stations 106 as well as a base station controller 112. The base station controller 112 may facilitate management of data between the macrocell base stations 110 and communicate data between the macrocell base stations 110 and one or more operator networks 114.

Although a certain number of each system, device, or network is shown in FIG. 1, a different number of each may exist in other examples. For example, numerous vehicle-based small cell base stations 106 that provide enhance network connectivity for the user device(s) 102 may exist. Each of the systems or devices will now be described in turn.

The user device(s) 102 may include any suitable processor-driven computing device including, but not limited to, a smartphone or other cellular device, a tablet device, an electronic reader device, a desktop computing device, a laptop computing device, a mainframe computing device, a gaming console, a multimedia content streaming device, or any other device capable of accessing, receiving, and/or displaying content received over one or more of the networks. The user device(s) 102 may communicate with one or more vehicle-based small cell base stations 106 and/or one or more macrocell base stations 110.

The user devices 102 may include hardware and/or software modules that may enable the user devices 102 to communicate with a respective macrocell base stations 110 or vehicle-based small cell base station 106 for requesting and obtaining data from the operator network 114. In one embodiment, the user devices 102 may include software drivers that enable such communication.

The one or more vehicles (104A-104N, collectively 104) depicted in FIG. 1 may include, but are not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, a motorcycle, or any other suitable vehicle. However, it will be appreciated that embodiments of the disclosure may also be utilized in other transportation or non-transportation related applications where enhanced mobile network capabilities are desired. Vehicles 104 may include a vehicle on-board platform, such as an in-vehicle infotainment (IVI) system. As used herein, an IVI system may refer to a system in a vehicle that provides entertainment and informational features for the vehicle 104. The IVI system may be part integrated with the main computer of the vehicle 104 or may be a stand-alone system in communication with the main computer of the vehicle 104. The IVI system may further include one or more processors communicatively coupled to an electronic memory.

As depicted, each vehicle 104 may include a vehicle-based small cell base station 106. A vehicle-based small cell base station 106 may be a small, low-powered cellular base station. The vehicle-based small cell base station 106 may be integrated with the main computer of the vehicle 104 or may be a stand-alone system in communication with the main computer of the vehicle 104. The vehicle-based small cell base station 106 may communicate with the IVI system associated with the vehicle 104. The vehicle-based small cell base station 106 may be a low-powered radio access note that has a range of approximately 10 meters to 1-2 kilometers that may facilitate and manage connections to a cellular network.

The macrocell base stations 110 may be a wireless communication station installed at a fixed location to facilitate communication over various types of networks, such as cellular Code Division Multiple Access (CDMA), Global System for Mobile Communications (GSM), wireless local loop, wide area network (WAN), wireless fidelity (WiFi), Worldwide Interoperability for Microwave Access (WiMax), etc. The macrocell base stations 110 may interface directly with user devices 102 or vehicle-based small cell base stations 106. The macrocell base stations 110 may communicate with one or more base station controllers 112.

The base station controller 112 may determine to which macrocell base stations 110 to route content, such as a voice call or data. The base station controller 112 may route information to a particular macrocell base station 110 (e.g., based on a geographic location of the macrocell base station 110A or 110N) for a user device 102. The base station controller 112 may interface with macrocell base stations 110, which may communicate directly with the user devices 102.

The operator network 114 may include various systems, devices, or components that may configure the operator network 114 to enable wireless communication via the wireless spectrum. An operator network 114 may be owned, controlled, or managed by various service providers, such as wireless service providers, telecommunications service providers, or other providers that may be licensed to utilize one or more frequencies associated with the wireless spectrum. In certain embodiments herein, the service providers may provide cellular communication services to users of user devices 102, such as mobile devices, mobile telephones, or other devices that may include a radio. The operator network 114 may be in communication with a content provider network (not shown). The content provider network may receive requests from the operator network 114 for content for users. The content provider network may receive user-associated information, such as user profiles, authentication credential, or user preferences from the user devices 102 either directly or through the operator network 114.

At least a portion of the devices shown in FIG. 1 may include a radio receiver (not shown). A physical layer interface in the radio receiver may include a radio frequency (RF) unit that may be configured to provide for reception of one or more RF signals. According to one configuration, the RF unit may include an amplifier, a mixer, a local oscillator, and so forth. The RF unit may be implemented as discrete electronic components, integrated circuits, software-defined radio, or a combination thereof, according to various configurations. At least a portion of the devices in FIG. 1 may also include a radio transmitter that may enable the devices to send one or more RF signals to one another. In some configurations, the devices may include a radio transceiver that may receive and send RF signals. The transceiver (or the receiver and/or the transmitter) may be coupled to one or more antennas, such as those associated with the operator network 114.

Figure 2:
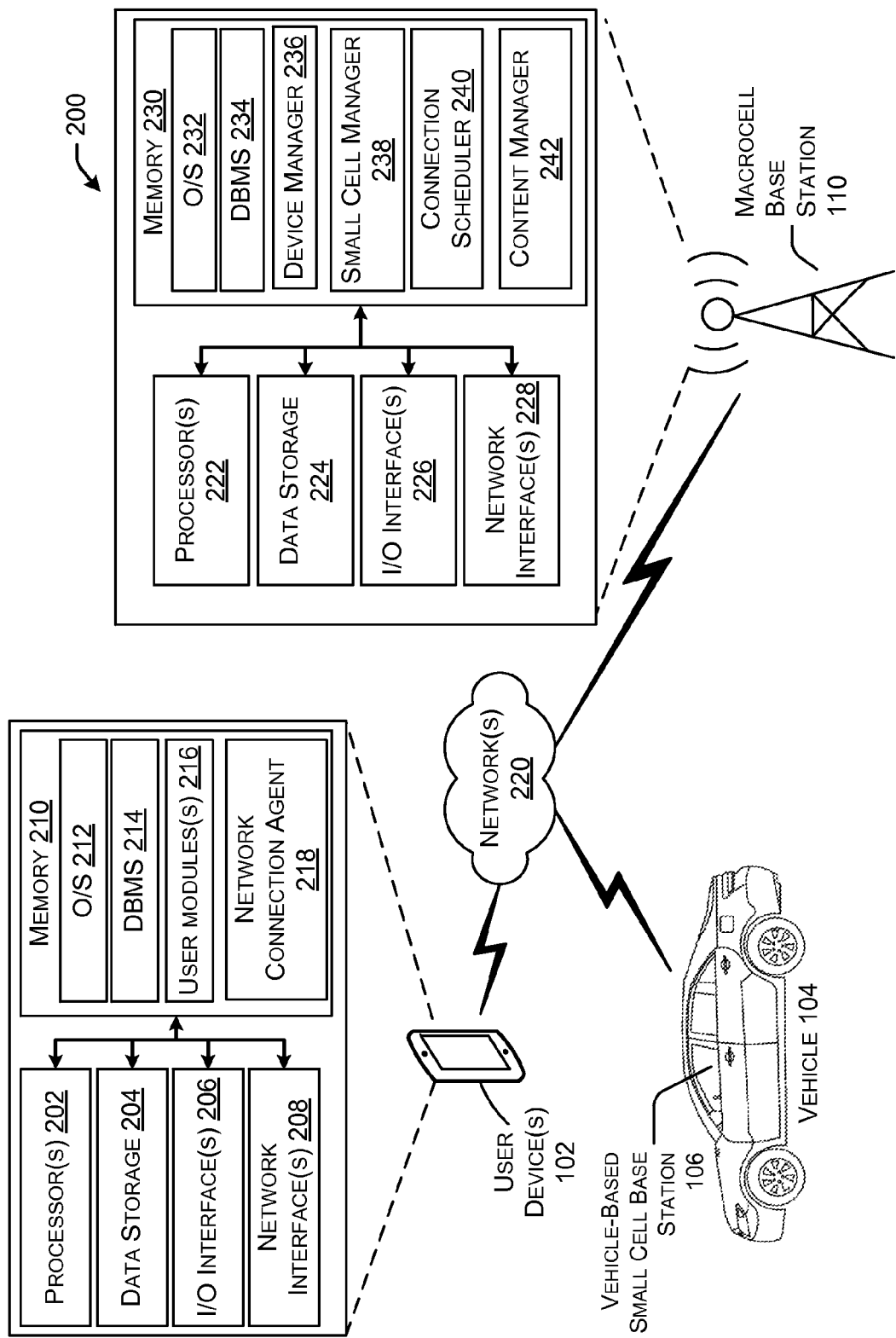
FIG. 2 illustrates a more detailed schematic block diagram of various hardware and software components of the illustrative system architecture 100 depicted in FIG. 1 in accordance with one or more embodiments of the disclosure.

FIG. 2 illustrates a more detailed schematic block diagram of various hardware and software components of the illustrative system architecture 100 depicted in FIG. 1 in accordance with one or more embodiments of the disclosure.

The illustrative architecture 200 may include one or more user devices 102 operable by one or more users, one or more vehicle-based small cell base stations 106, and one or more macrocell base stations 110 communicating over one or more networks 220.

The user device(s) 102 may interact with one or more vehicle-based small cell base stations 106, one or more macrocell base stations 110, and so forth. The user device(s) 102 may include any suitable processor-driven computing device including, but not limited to, a smartphone or other cellular device, a tablet device, an electronic reader device, a desktop computing device, a laptop computing device, a mainframe computing device, a gaming console, a multi-media content streaming device, or any other device capable of accessing, receiving, and/or displaying content received over one or more of the networks.

In an illustrative configuration, the user device 102 may include one or more processor(s) 202, one or more memory devices 210 (generically referred to herein as memory 210), data storage 204, one or more input/output (I/O) interface(s) 206, and/or one or more network interface(s) 208. For ease of explanation, the user device 102 will be referred to hereinafter in the singular. However, it should be appreciated that multiple user devices 102 may be utilized.

The memory 210 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 210 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 210 may store computer-executable instructions that are loadable and executable by the processor(s) 202, as well as data manipulated and/or generated by the processor(s) 202 during the execution of the computer-executable instructions. For example, the memory 210 may store one or more operating systems (0/S) 212; one or more database management systems (DBMS) 214; one or more program modules such as one or more user modules 216, one or more network connection agent(s) 218, and so forth; and/or various other types of data and/or computer-executable instructions. The various illustrative program modules depicted as being loaded into the memory 210 may include computer-executable instructions that are responsive to execution by the processor(s) 202 which cause various processing to be performed. In order to perform such processing, the program modules may utilize, at least in part, data stored in the memory 210, data stored in the data storage 204, and/or data stored in one or more external datastores (not shown).

The user module(s) 216 may include computer-executable instructions to provide functionality such as, for example, location tracking of the user device 102 (e.g., GPS tracking) or data usage associated with one or more user applications.

The network connection agent 218 may identify vehicle-based small cell base stations 106 or macrocell base stations 110. In some embodiments, the network connection agent 218 may identify several vehicle-based small cell base stations 106 or macrocell base stations 110, and select the entity with the strongest signal with the highest throughput. In some embodiments, the network connection agent 218 may manage multiple connections to different entities at the same time. For example, the network connection agent 218 may establish a connection with a first vehicle-based small cell base station 106A and a second vehicle-based small cell base station 106B and manage the information sent and received by the different entities and the user device 102. For example, the network connection agent 218 may manage the connections with multiple vehicle-based small cell base stations 106 and facilitate handoffs of one or more connections to an identified vehicle-based small cell base station 106 based at least in part on information associated with the identified vehicle-based small cell base station 106, such as location, current load, or the like.

The (0/S) 212 loaded into the memory 210 may provide an interface between other application software executing on the user device 102 and hardware resources of the user device 102. More specifically, the O/S 212 may include a set of computer-executable instructions for managing hardware resources of the user device 102 and for providing common services to other application programs (e.g., managing memory allocation among various application programs). The O/S 212 may include any operating system now known or which may be developed in the future including, but not limited to, any server operating system, any desktop or laptop operating system, any mainframe operating system, any mobile operating system, or any other proprietary or freely available operating system.

The user device 102 may further include data storage 204 such as removable storage and/or non-removable storage including, but not limited to, magnetic storage, optical disk storage, and/or tape storage. Data storage 204 may provide non-transient storage of computer-executable instructions and other data. The data storage 204 may include storage that is internal and/or external to the user device 102. The memory 210 and/or the data storage 204, removable and/or non-removable, are examples of computer-readable storage media (CRSM) as that term is used herein.

It should be appreciated that any data and/or computer-executable instructions stored in the memory 210 may be additionally, or alternatively, stored in the data storage 204 and/or one or more external datastores (not shown). The DBMS 214 depicted as being loaded into the memory 210 may support functionality for accessing, retrieving, storing, and/or manipulating data stored in external datastore(s), data stored in the memory 210, and/or data stored in the data storage 204. The DBMS 214 may use any of a variety of database models (e.g., relational model, object model, etc.) and may support any of a variety of query languages.

The processor(s) 202 may be configured to access the memory 210 and execute computer-executable instructions stored therein. For example, the processor(s) 202 may be configured to execute computer-executable instructions of the various program modules of the user device 102 to cause or facilitate various operations to be performed in accordance with one or more embodiments of the disclosure. The processor(s) 202 may include any suitable processing unit capable of accepting digital data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The user device 102 may further include one or more I/O interfaces 206 that may facilitate the receipt of input information by the user device 102 from one or more I/O interfaces 206 as well as the output of information from the user device 102 to the one or more I/O interfaces 206. The I/O interfaces 206 may include, for example, one or more user interface devices that facilitate interaction between a user and the user device 102 including, but not limited to, a display, a keypad, a pointing device, a control panel, a touch screen display, a remote control device, a microphone, a speaker, and so forth.

The user device 102 may be configured to communicate with any of a variety of other systems, platforms, devices, and so forth (e.g., the vehicle-based small cell base station(s) 106, macrocell base station 110, etc.) via one or more of the network(s) 220. The user device 102 may include one or more network interfaces 208 that may facilitate communication between the user device 102 and any of the above-mentioned systems, platforms or devices.

The vehicle-based small cell base station 106 may be located in a vehicle 104, either integrated into the main computer of the vehicle 104 or as a stand-alone system in communication with the main computer of the vehicle 104. An illustrative architecture of a vehicle-based small cell base station 106 is further discussed in FIG. 3.

Now referring to the macrocell base stations 110, the macrocell base stations 110 may include, but are not limited to, cellular base stations configured to receive and respond to requests and data from user devices, a mainframe computer, vehicle-based small cell base stations 106 or any other suitable computing device, and may be organized in accordance with any suitable configuration (e.g., a cluster of servers). The macrocell base stations 110 may be configured to communicate with any other such component of the architecture 100 via one or more networks, such as network 220 or base station controller 112 and operator network 114.

Referring still to the macrocell base stations 110, in an illustrative configuration, the macrocell base stations 110 may include one or more processor(s) 222, one or more memory devices 230 (generically referred to herein as memory 230), data storage 224, one or more input/output (I/O) interface(s) 226, and/or one or more network interface(s) 228. For ease of explanation, the macrocell base stations 110 will be referred to hereinafter in the singular. However, it should be appreciated that multiple macrocell base stations 110 may be provided.

The memory 230 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 230 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 230 may store computer-executable instructions that are loadable and executable by the processor(s) 222, as well as data manipulated and/or generated by the processor(s) 222 during the execution of the computer-executable instructions. For example, the memory 230 may store one or more operating systems (O/S) 232; one or more database management systems (DBMS) 234; a device manager 236; a small cell manager 238; a connection scheduler 240, a content manager 242 and/or various other types of data and/or computer-executable instructions. The various illustrative program modules depicted as being loaded into the memory 230 may include computer-executable instructions that in response to execution by the processor(s) 222 cause various processing to be performed. The data utilized by the various program modules may be stored in the memory 230 (as depicted), in the data storage 224, and/or in one or more external datastores (not shown).

The (O/S) 232 loaded into the memory 230 may provide an interface between other application software executing on the macrocell base station 110 and hardware resources of the vehicle-based small cell base station(s) 106. More specifically, the O/S 232 may include a set of computer-executable instructions for managing hardware resources of the macrocell base station 110 and for providing common services to other application programs (e.g., managing memory allocation among various application programs). The O/S 232 may include any operating system now known or which may be developed in the future including, but not limited to, any server operating system, any desktop or laptop operating system, any mainframe operating system, any mobile operating system, or any other proprietary or freely available operating system.

The macrocell base station 110 may further include data storage 224 such as removable storage and/or non-removable storage including, but not limited to, magnetic storage, optical disk storage, and/or tape storage. Data storage 224 may provide non-transient storage of computer-executable instructions and other data. The data storage 224 may include storage that is internal and/or external to the vehicle-based small cell base station(s) 106. The memory 230 and/or the data storage 224, removable and/or non-removable, are examples of computer-readable storage media (CRSM) as that term is used herein.

It should be appreciated that any data and/or computer-executable instructions stored in the memory 230 may be additionally, or alternatively, stored in the data storage 224 and/or one or more external datastores (not shown). The DBMS 234 depicted as being loaded into the memory 230 may support functionality for accessing, retrieving, storing, and/or manipulating data stored in external datastore(s), data stored in the memory 230, and/or data stored in the data storage 224. The DBMS 234 may use any of a variety of database models (e.g., relational model, object model, etc.) and may support any of a variety of query languages.

The processor(s) 222 may be configured to access the memory 230 and execute computer-executable instructions stored therein. For example, the processor(s) 222 may be configured to execute computer-executable instructions of the various program modules of the macrocell base station 110 to cause or facilitate various operations to be performed in accordance with one or more embodiments of the disclosure. The processor(s) 222 may include any suitable processing unit capable of accepting digital data as input, processing the input data in accordance with stored computer-executable instructions, and generating output data. The processor(s) 222 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The macrocell base station 110 may further include one or more I/O interfaces 226 that may facilitate the receipt of input information by the macrocell base stations 110 from one or more I/O devices as well as the output of information from the macrocell base station 110 to the one or more I/O devices. The I/O devices may include, for example, one or more user interface devices that facilitate interaction between a user and the vehicle-based small cell base station 106 including, but not limited to, a display, a keypad, a pointing device, a control panel, a touch screen display, a remote control device, a microphone, a speaker, and so forth.

The macrocell base station 110 may be configured to communicate with any of a variety of other systems, platforms, devices, and so forth (e.g., the user device(s) 102, vehicle-based small cell base stations 106, etc.) via one or more of the network(s) 220. The macrocell base station 110 may include one or more network interfaces 228 that may facilitate communication between the macrocell base station 110 and any of the above-mentioned systems, platforms or devices.

According to various embodiments of the disclosure, the device manager 236 may include computer-executable instructions for facilitating receiving data from one or more user devices 102 to monitor network traffic, monitor user device 102 locations, and track requests and content transmitted to and from the user devices 102. The device manager 236 may track user network consumption history, content request history, and the like. The device manager 236 may monitor and track the current location of the user device 102 and may receive information associated with the movement of the user device 102 (e.g., direction, velocity, etc.).

According to various embodiments of the disclosure, the small cell manager 238 may include computer-executable instructions for facilitating the receipt of data from one or more vehicle-based small cell base stations 106 to monitor network traffic, monitor vehicle-based small cell base station 106 locations, active connections associated with the vehicle-based small cell base stations 106, movement of the vehicle-based small cell base stations 106 (e.g., direction, velocity, etc.), and the like. The small cell manager 238 may track active network consumption, and previous and active user device associations.

According to various embodiments of the disclosure, the connection scheduler 240 may include computer-executable instructions for scheduling transmission of data and content to one or more user devices 102 or one or more vehicle-based small cell base stations 106. The connection scheduler 240 may determine, based at least in part on information obtained or received from the device manager 236 and/or the small cell manager 238, to transmit data (e.g., content) to a user device 102 or vehicle-based small cell base station 106. The connection scheduler 240 may pre-associate user devices 102 to one or more vehicle-based small cell base stations 106 based at least in part on data associated with the user device 102 and/or the vehicle-based small cell base station 106. For example, the connection scheduler 240 may pre-associate a user device 102 on a highway heading north with a vehicle-based small cell base station 106 in a vehicle 104 several miles north of the current location of the user device 102 but heading in the same direction. The connection scheduler 240 may instruct the content manager to obtain and transmit data (e.g., content) to the vehicle-based small cell base station 106 so that the vehicle-based small cell base station 106 may pre-cache the data prior to a connection being established between the user device 102 and the vehicle-based small cell base station 106.

According to various embodiments of the disclosure, the content manager 242 may include computer-executable instructions for facilitating the obtaining of data (e.g., content), such as from a content network. In some embodiments, the content manager 242 may receive user preferences, user profile, or other information associated with a user of the user device 102. In some embodiments, the content manager 242 may request for specific content (e.g., such as a specific web page or video) from a user device 102 or vehicle-based small cell base station 106. The content manager 242 may obtain or retrieve data based at least in part on any information or request received from a user device 102 or vehicle-based small cell base station 106. In some embodiments, the content manager 242 may identify and retrieve suggested content for a user based at least in part on information associated with the user, such as user preferences or user profile. In some embodiments, the content manager 242 may transmit obtained or retrieved content directly to a user device 102. The content manager 242 may transmit obtained or retrieved content to a vehicle-based small cell base station 106. In some embodiments, the content manager 242 may transmit a portion of the content to a vehicle-based small cell base station 106 and another portion of the content to a different vehicle-based small cell base station 106 based at least in part on instructions received from the connection scheduler 240.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 100, and the associated functionality that such components support, are merely illustrative and that some components may not be present or additional components may be provided in various embodiments. While various program modules have been depicted and described with respect to various illustrative components of the architecture 100, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Figure 3:
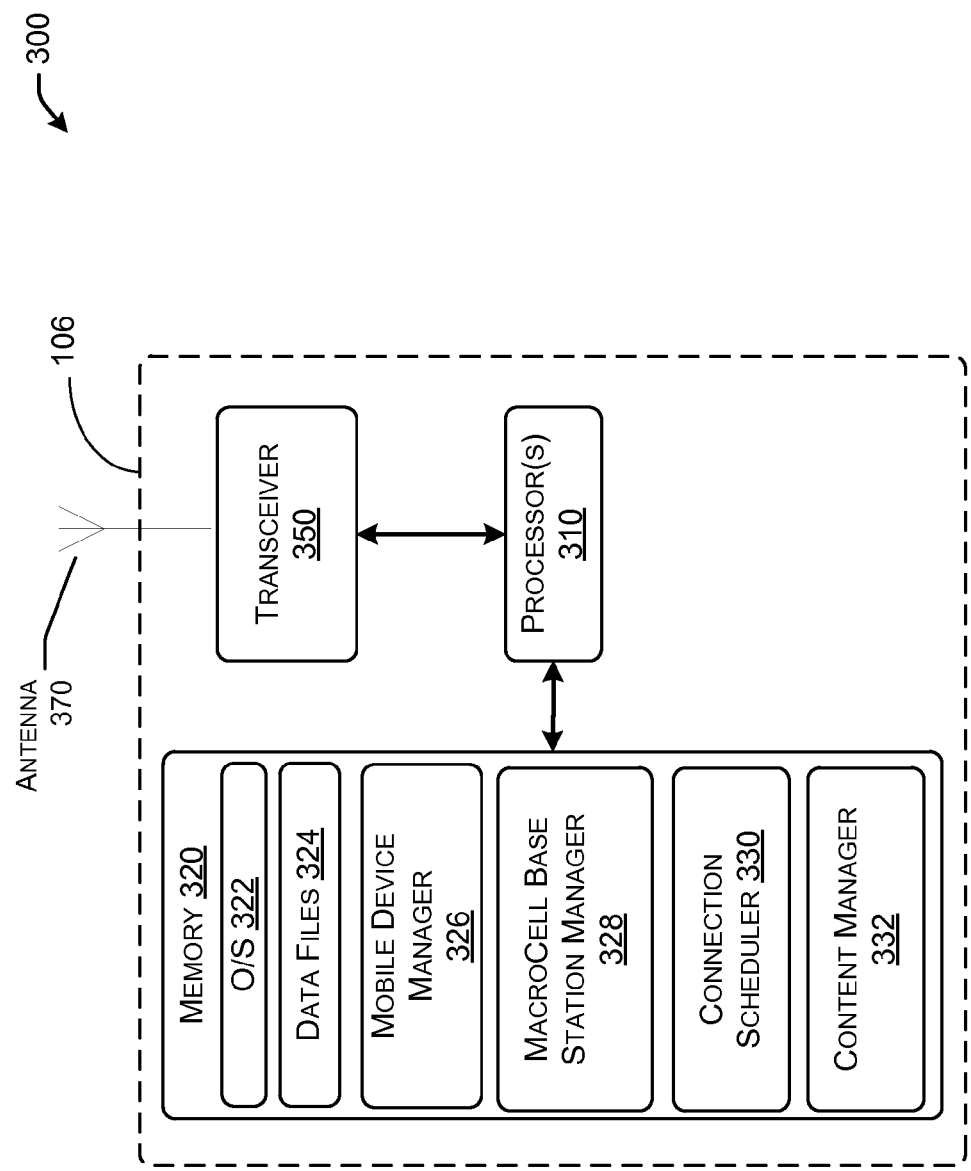
FIG. 3 illustrates a more detailed schematic block diagram of various hardware and software components of the vehicle-based small cell base station in accordance with one or more embodiments of the disclosure.

FIG. 3 illustrates a more detailed schematic block diagram of various hardware and software components of the vehicle-based small cell base station 106 in accordance with one or more embodiments of the disclosure. Multiple vehicle systems may exist in a vehicle 104. For example, a computing system (not shown) may exist for controlling standard devices or components of a vehicle 104, which may include engine devices, braking devices, power steering devices, door control devices, window control devices, battery or other power sources etc., location tracking devices (e.g., global positioning systems), in one embodiment. The computing system may also include various input/output (I/O) devices that may exist in a vehicle 104, such as image sensors or collection devices and display devices, such as light-emitting diode (LED) displays and organic light-emitting diode (OLED) displays, as non-limiting examples. A main processor may communicate with the standard engine control devices and I/O devices to activate the devices, send information to these devices, or collect information from these devices, as non-limiting examples. In some embodiments, the vehicle-based small cell base station 106 may be a stand-alone system, where the base station is not integrated with a vehicle system but may communicate with one or more vehicle systems. In some embodiments, the vehicle-based small cell base station 106 may be integrated as part of a vehicle system, such as the vehicle computing system or a vehicle IVI system.

The processor(s) 310 may be configured to access the memory 320 and execute computer-executable instructions stored therein. For example, the processor(s) 310 may be configured to execute computer-executable instructions of the various program modules of the vehicle-based small cell base station 106 to cause or facilitate various operations to be performed in accordance with one or more embodiments of the disclosure. The processor(s) 310 may include any suitable processing unit capable of accepting digital data as input, processing the input data in accordance with stored computer-executable instructions, and generating output data. The processor(s) 310 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), and so forth.

The memory 320 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the 320 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The memory 320 may store computer-executable instructions that are loadable and executable by the processor(s) 310, as well as data manipulated and/or generated by the processor(s) 310 during the execution of the computer-executable instructions. For example, the memory 320 may store one or more operating systems 322; one or more data files 324; and one or more program modules, such as a mobile device manager 326, a macrocell base station manager 328, a connection scheduler 330, and/or a content manager 332. The various illustrative program modules depicted as being loaded into the memory 320 may include computer-executable instructions that in response to execution by the processor(s) 310 cause various processing to be performed. In order to perform such processing, the program modules may utilize various data stored in the memory 320, in data storage, and/or in one or more external datastores.

The vehicle-based small cell base station 106 may include a radio transceiver 350 that may receive and send Radio Frequency (RF) signals from one or more user devices 102, one or more macrocell base stations 110, and/or one or more other vehicle-based small cell base stations 106. The transceiver (or the receiver and/or the transmitter) may be coupled to one or more antennas 370 for increased signal strength.

Turning now to the contents of the memory 320, the memory 320 may include any number of suitable memory devices, such as caches, read-only memory devices, random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, magnetic storage devices, removable storage devices (e.g., memory cards, etc.), and/or non-removable storage devices. As desired, the memory 320 may include internal memory devices and/or external memory devices in communication with the system 300.

The memory 320 may store data, executable instructions, and/or various program modules utilized by the processor 310. Examples of data that may be stored by the memory 320 include data files 324 and any number of suitable program modules and/or applications that may be executed by the processor 310, such as, but not limited to, an operating system (O/S) 322, a mobile device manager 326, a macrocell base station manager 328, and a content manager 332. Each of these modules may be implemented as individual modules or, alternatively, one or more of the modules may perform all or at least some of the functionality associated with the other modules. In certain embodiments, these modules may be stored as firmware in a read-only memory 320, thereby making it more difficult for the functions described herein to be tampered with or disabled.

The data files 324 may include any suitable information that may facilitate network connectivity by the vehicle-based small cell base station 106. The operating system 322 may include a suitable module or application that facilitates general operation of the system 300, as well as the execution of other program modules illustrated in the memory 320 in FIG. 3.

According to various embodiments of the disclosure, the mobile device manager 326 may include computer-executable instructions for facilitating receiving data from one or more user devices 102 to monitor network traffic, monitor user device 102 locations, and track requests and content transmitted to and from the user devices 102. The mobile device manager 326 may track user network consumption history, content request history, and the like. The mobile device manager 326 may monitor and track the current location of the user device(s) 102 and may receive information associated with the movement of the user device(s) 102 (e.g., direction, velocity, etc.).

According to various embodiments of the disclosure, the macrocell base station manager 328 may include computer-executable instructions for facilitating receiving data from one or more macrocell base stations 110 to monitor network traffic and the like. The macrocell base station manager 328 may track active macrocell base station 110 connections, availability of macrocell base stations 110, type of cellular network associated with the macrocell base station(s) 110, location of the macrocell base stations 110, and the like.

According to various embodiments of the disclosure, the content manager 332 may include computer-executable instructions for facilitating the obtaining of content, such as from a content network. In some embodiments, the content manager 332 may receive user preferences, user profile, or other information associated with a user of the user device 102. In some embodiments, the content manager 332 may receive requests for specific content from a user device 102 or from a different vehicle-based small cell base station 106. The content manager 332 may obtain or retrieve content based at least in part on any information or request received from a user device 102 or a second vehicle-based small cell base station 106. In some embodiments, the content manager 332 may transmit cached content to a vehicle-based small cell base station 106 to which the user device 102 connection will be passed.

According to various embodiments of the disclosure, the connection scheduler 330 may include computer-executable instructions for scheduling transmission of data and content to one or more user devices 102 or one or more vehicle-based small cell base stations 106. The connection scheduler 330 may determine, based at least in part on information obtained or received from the device manager 326 and/or the macrocell base station manager 328, to transmit data and/or content to a user device 102 or macrocell base station manager 328. The connection scheduler 330 may request another vehicle-based small cell base station 106 to accept a connection with a user device 102 based at least in part on data associated with the user device 102, vehicle-based small cell base station 106 and/or the macrocell base station 110. For example, the connection scheduler 330 may request another vehicle-based small cell base station 106 to associate with a user device 102 on a highway heading north after determining the signal or connection with the user device 102 begins to weaken or drop. The connection scheduler 330 may instruct the content manager 332 to transmit content to the second vehicle-based small cell base station 106 so that the vehicle-based small cell base station 106 may pre-cache the data prior to a connection being established between the user device 102 and the second vehicle-based small cell 106 to ensure a seamless user experience for the user device 102 during the handoff.

In addition to or alternative to the memory 320, other embodiments may include one or more suitable computer-readable media that may be provided for storing computer-executable instructions such as those stored in the memory 320. One or more processing devices, such as the processor 310, may execute such computer-executable instructions to facilitate the remote management of a vehicle, as described above in association with the modules 326, 328, 330, 332 in the memory 320. As used herein, the term "computer-readable medium" may describe any form of suitable memory or memory device for retaining information in any form, including various kinds of storage devices (e.g., magnetic, optical, static, etc.) that are non-transitory. Indeed, various embodiments of the disclosure may be implemented in a wide variety of suitable forms.

Figure 4:
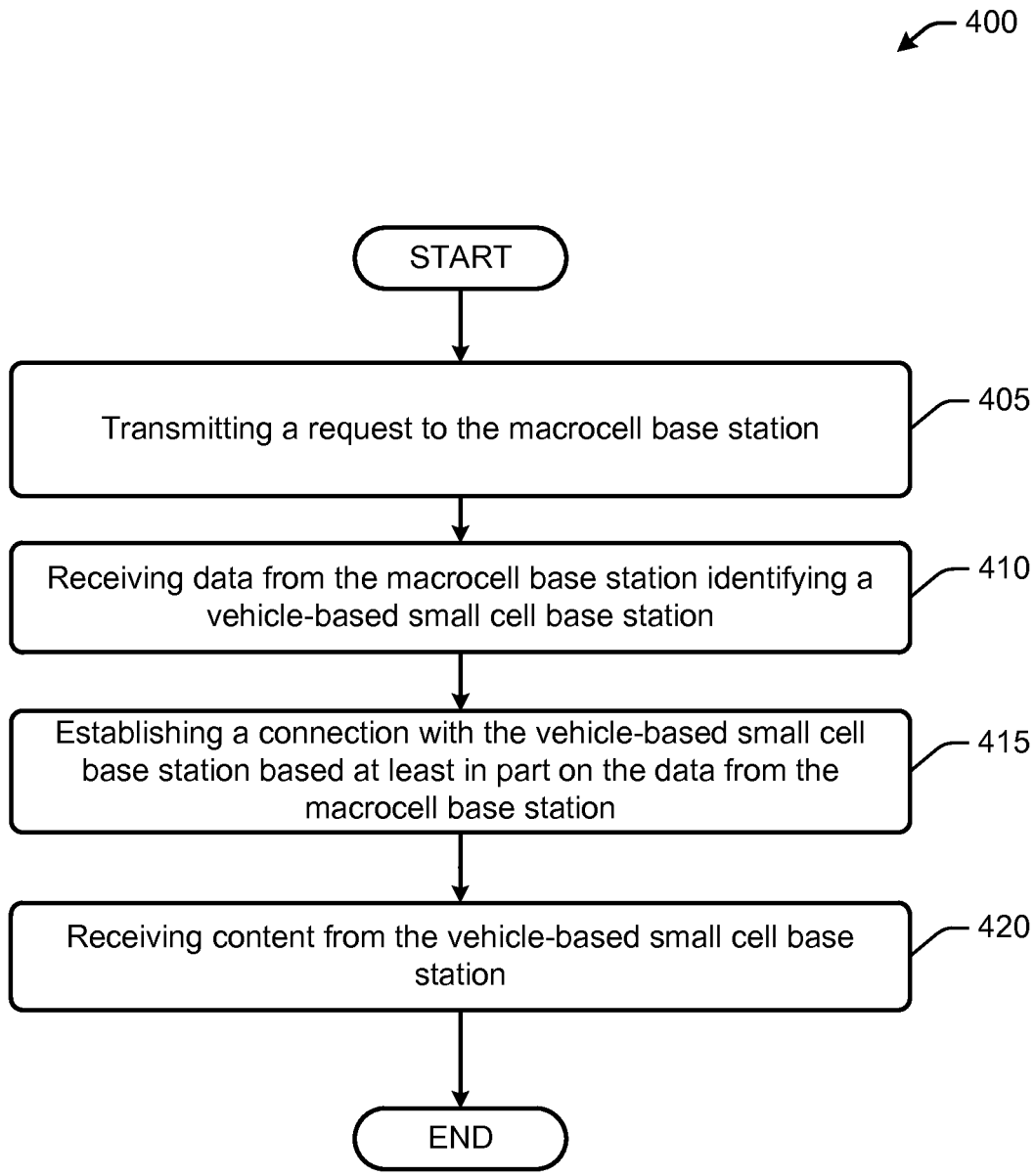
FIG. 4 illustrates a flow diagram of an example process for a user device in a cellular network infrastructure that includes vehicle-based small cell base stations, in accordance with one or more embodiments of the disclosure.

FIG. 4 illustrates a flow diagram of an example process for a user device 102 in a cellular network infrastructure that includes vehicle-based small cells base stations 106, in accordance with one or more embodiments of the disclosure. At block 405, a request may be transmitted to a device manager 236 of a macrocell base station 110 by a network connection agent 218 of a user device 102. In some embodiments, the request may include authentication credentials, user preferences, a user profile, request for content, a request to establish a connection, or the like.

At block 410, the network connection agent 218 may receive data from the connection scheduler 240 of the macrocell base station 110 identifying a vehicle-based small cell base station 106. The data may include data indication a pre-association of the vehicle-based small cell base station 106 and the user device 102 determined by the connection scheduler 240 of the macrocell base station 110. In some embodiments, the data may include instructions for the user device 102 to establish a connection with the vehicle-based small cell base station 106. For example, the data and/or instructions may include an identifier associated with the vehicle-based small cell base station 106, a current location of the vehicle-based small cell base station 106, or the like. In some embodiments, the data may include user preferences associated with a user of the user device 102 or a user profile associated with the user of the user device 102. In some embodiments, the user device 102 may receive data from the macrocell base station 110 identifying multiple vehicle-based small cell base stations 106 in the vicinity (e.g., within a pre-determined distance, such as 20 kilometers, or a pre-determined threshold signal strength from the vehicle-based small cell base station 106) of the user device 102. The network connection agent 218 of the user device 102 may determine or choose one of the vehicle-based small cell base stations 106 identified by the macrocell base station 110. In some embodiments, the network connection agent 218 may choose a vehicle-based small cell base station 106 from the list of identified vehicle-based small cell base stations 106 by comparing the throughput of the channels associated with the vehicle-based small cell base stations 106 and choosing the vehicle-based small cell base station 106 with the channel with the highest throughput or signal strength, direction, speed, movement of the user device 102 and/or the vehicle-based small cell base station 106, data associated with reception issues in the area or the like.

In some embodiments, the network connection agent 218 of a user device 102 may identify one or more vehicle-based small cell base stations 106 within a pre-determined distance or a pre-determined threshold signal strength from the vehicle-based small cell base station 106 and may transmit the information associated with the identified one or more vehicle-based small cell base station 106 to a macrocell base station 110. In some embodiments, each vehicle-based small cell base station 106 may transmit information about its current location, direction, speed, and the like, to the macrocell base station 110. The small cell manager 238 of the macrocell base station 110 may receive the information from the vehicle-based small cell base stations 106 and transmit the information to the connection scheduler 240.

The connection scheduler 240 may receive data from the device manager 236. The data from the device manager 236 may indicate one or more user devices 102 seeking to establish a connection. The connection scheduler 240 may identify one or more vehicle-based small cell base stations 106 with which the user device 102 may establish a connection. The connection scheduler 240 may identify the one or more vehicle-based small cell base stations 106 based on a multiple factors, such as type of vehicle-based small cell base station 106, network type associated with the vehicle-based small cell base station 106, location of the vehicle-based small cell base station 106, directional movement of the vehicle-based small cell base station 106, current associations of the vehicle-based small cell base station 106, and the like. In some embodiments, the connection scheduler 240 may pre-associate a user device 102 with a vehicle-based small cell base station 106 and transmit the data associated with the association to at least one of the user device 102 or vehicle-based small cell base station 106 to facilitate establishing a connection.

At block 415, a user device 102 may establish a connection with the vehicle-based small cell base station 106 based at least in part on the data from the macrocell base station 110. In some embodiments, the data from the macrocell base station 110 may be pre-association information indicating a pre-association with a vehicle-based small cell base station 106. In some embodiments, the data from the macrocell base station 110 may be a list of vehicle-based small cell base stations 106 the user device 102 may select to establish a connection. In some embodiments, the user device 102 may initiate the connection. In some embodiments, the vehicle-based small cell base station 106 may initiate the connection.

At block 420, the user device 102 may receive content from the vehicle-based small cell base station 106. The content may be received by one or more user modules 216 of the user device 102 from a content manager 332 of the vehicle-based small cell base station 106. In some embodiments, the user device 102 may receive content from the content manager 332 of the vehicle-based small cell base station 106 that was pre-cached in anticipation of the connection between the user device 102 and the vehicle-based small cell base station 106. In some embodiments, the content may be content suggested or identified by the content manager 242 of the macrocell base station 110 based at least in part on user preferences or a user profile associated with a user of the user device 102 transmitted to the content manager 242 of the macrocell base station 110. In some embodiments, the user preferences or user profile may be transmitted to the macrocell base station 110 by the user device 102 or may be transmitted by the content manager 242 of the vehicle-based small cell base station 106. In some embodiments, the content may be content identified based at least in part on user content request histories.

In some embodiments, the user device 102 may receive data from the macrocell base station 110 identifying a second vehicle-based small cell base station 106. For example, the macrocell base station 110 may determine that the user device 102 is about to leave the range of the vehicle-based small cell base station 106 to which it is connected and the macrocell base station 110 may identify another vehicle-based small cell base station 106 near the user device 102 or about to enter in the range of the user device 102. The user device 102 may establish a second connection with the second vehicle-based small cell base station 106 and begin receiving content, some of which may have been cached in advance of the connection, from the second vehicle-based small cell base station 106. In some embodiments, the macrocell base station 110 may have transmitted to the second vehicle-based small cell base station 106 the content being served by the initial vehicle-based small cell base station 106 to ensure that the transition or handover of network connectivity between the first and second vehicle-based small cell base stations 106 appears seamless to the user device 102.

Figure 5:
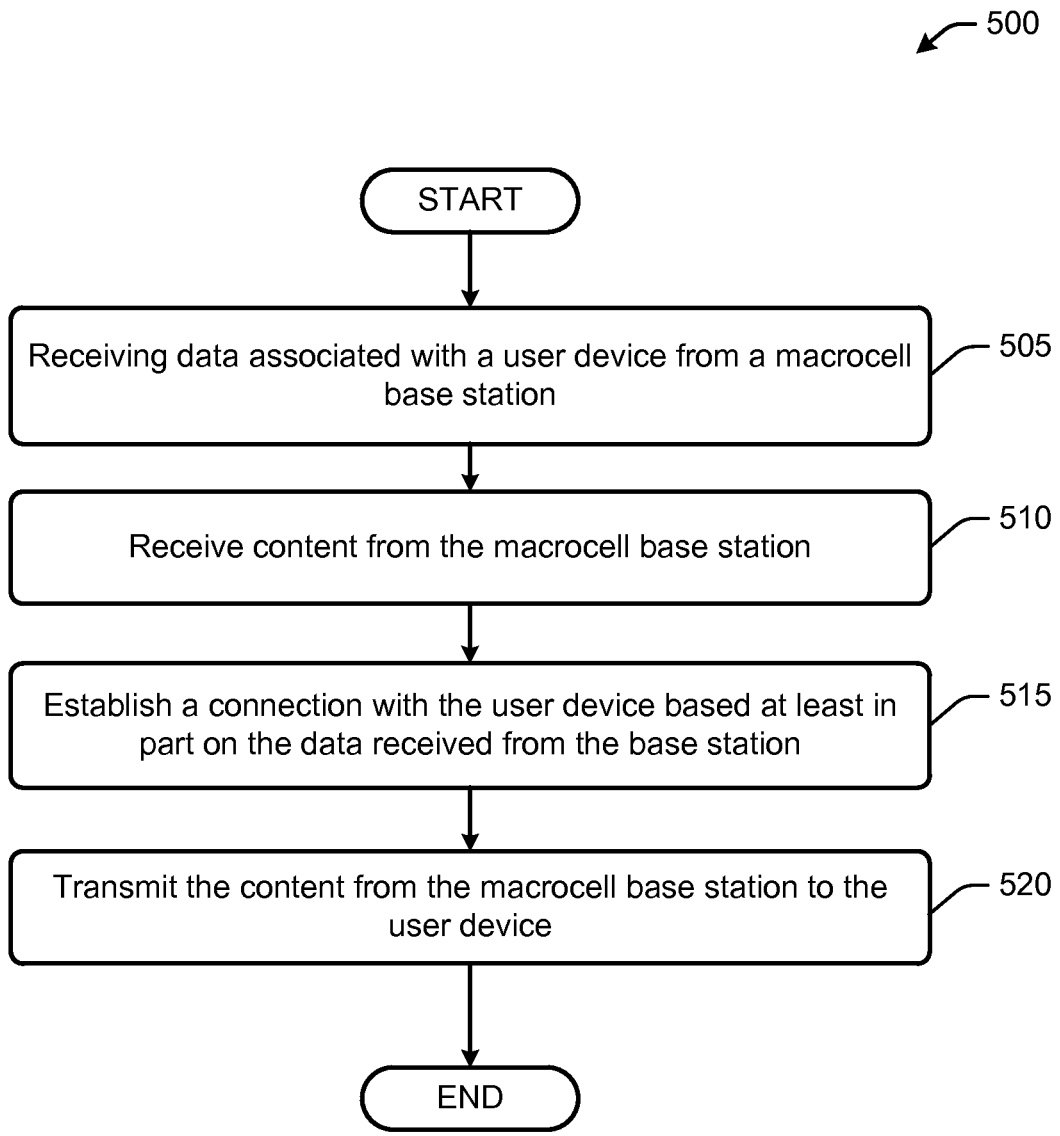
FIG. 5 illustrates a flow diagram of an example process for a vehicle-based small cell base station in a cellular network infrastructure that includes vehicle-based small cell base stations, in accordance with one or more embodiments of the disclosure.

FIG. 5 illustrates a flow diagram of an example process for a vehicle-based small cell base station 106 in a cellular network infrastructure that includes vehicle-based small cell base stations 106, in accordance with one or more embodiments of the disclosure. At block 505, a mobile device manager 326 of a vehicle-based small cell base station 106 may receive data associated with a user device 102 from a macrocell base station 110. In some embodiments, the data associated with the user device 102 may include a current location of the user device 102, type of data requested by the user device 102, or user preferences associated the user device 102. In some embodiments, the data associated with the user device 102 may include authentication credentials associated with the user device 102 that may be needed in order to access the network or access content. The content manager 242 of the macrocell base station 110 or the content manager 332 of the vehicle-based small cell base station 106 may receive the authentication credentials from the user device 102. The connection scheduler 330 of the vehicle-based small cell base station 106 may authenticate the user device 102 based at least in part on the received authentication credentials.

At block 510, the content manager 332 of the vehicle-based small cell base station 106 may receive content from the macrocell base station 110. In some embodiments, the content received from the macrocell base station 110 may be received and pre-cached prior to establishing the connection with the user device 102.

At block 515, a connection scheduler 330 of a vehicle-based small cell base station 106 may establish a connection with the user device 102 based at least in part on the data received from the macrocell base station 110 and/or data received from one or more user device(s) 102. The connection scheduler 330 may analyze data from the mobile device manager 326, macrocell base station manager 328, and/or the content manager 332 to determine the current capacity of the vehicle-based small cell base station 106. For example, the connection scheduler 330 may identify the number of current active connections to user device(s) 102 and determine that additional connections may diminish the connection quality of the active connections or that the vehicle-based small cell base station 106 has sufficient capacity to establish a connection with the user device 102 without affecting the active connections. The connection scheduler 330 may determine that the type of content being requested by the user device 102 may require a certain amount of bandwidth that the vehicle-based small cell base station 106 is capable of handling without negatively impacting other connections. In some embodiments, the connection scheduler 330 may determine that the type of content being requested (e.g., streaming video) would require too much bandwidth and may deny the connection with the user device. In some embodiments, the connection scheduler 330 may receive information from the macrocell base station manager 328 that indicates that the user device is currently within range of the vehicle-based small cell base station 106 but is traveling in a direction away from the vehicle-based small cell base station 106 and may determine to deny the connection with the user device 102. In some embodiments, if the connection scheduler 330 denies a request to establish a connection with a user device 102, the vehicle-based small cell base station 106 may either identify another vehicle-based small cell base station 106 that is able to accept the connection request or may communicate with the connection scheduler 240 of the macrocell base station 110 so that the macrocell base station may identify another vehicle-based small cell base station 106 to establish a connection with the user device 102.

At block 520, the content manager 332 of the vehicle-based small cell base station 106 may transmit the content from the macrocell base station 110 to the user device 102. In some embodiments, the content may be received from the macrocell base station 110 based at least in part on the request from the user device 102. The content may be identified by the content manager 242 of the macrocell base station 110 or the content manager 332 of the vehicle-based small cell base station 106 based at least in part on the request from the user device 102, user preferences associated with the user device 102, and/or viewing history associated with the user device 102.

In some embodiments, the vehicle-based small cell base station 106 may receive location data associated with the user device 102 from the user device 102 or the macrocell base station 110. The vehicle-based small cell base station 106 may identify a second vehicle-based small cell base station 106 nearby. In some embodiments, the vehicle-based small cell base station 106 may detect the second vehicle-based small cell base station 106 based on radio signals emitted by the second vehicle-based small cell base station 106. The vehicle-based small cell base station 106 may facilitate a handover of the connection to the second vehicle-based small cell base station 106 based at least in part the location data associated with the user device 102. In some embodiments, the vehicle-based small cell base station 106 may facilitate a handover of the connection to the second vehicle-based small cell base station 106 by instructing the user device 102 to establish a connection with the second vehicle-based small cell base station 106 and terminating the connection with the user device 102 once the connection with the second vehicle-based small cell base station 106 has been established. In some embodiments, the vehicle-based small cell base station 106 may instruct the user device 102 to establish a connection with the second vehicle-based small cell base station 106 and terminate the connection with the user device 102 in order for the user device to establish a connection with the second vehicle-based small cell base station 106.

Figure 6:
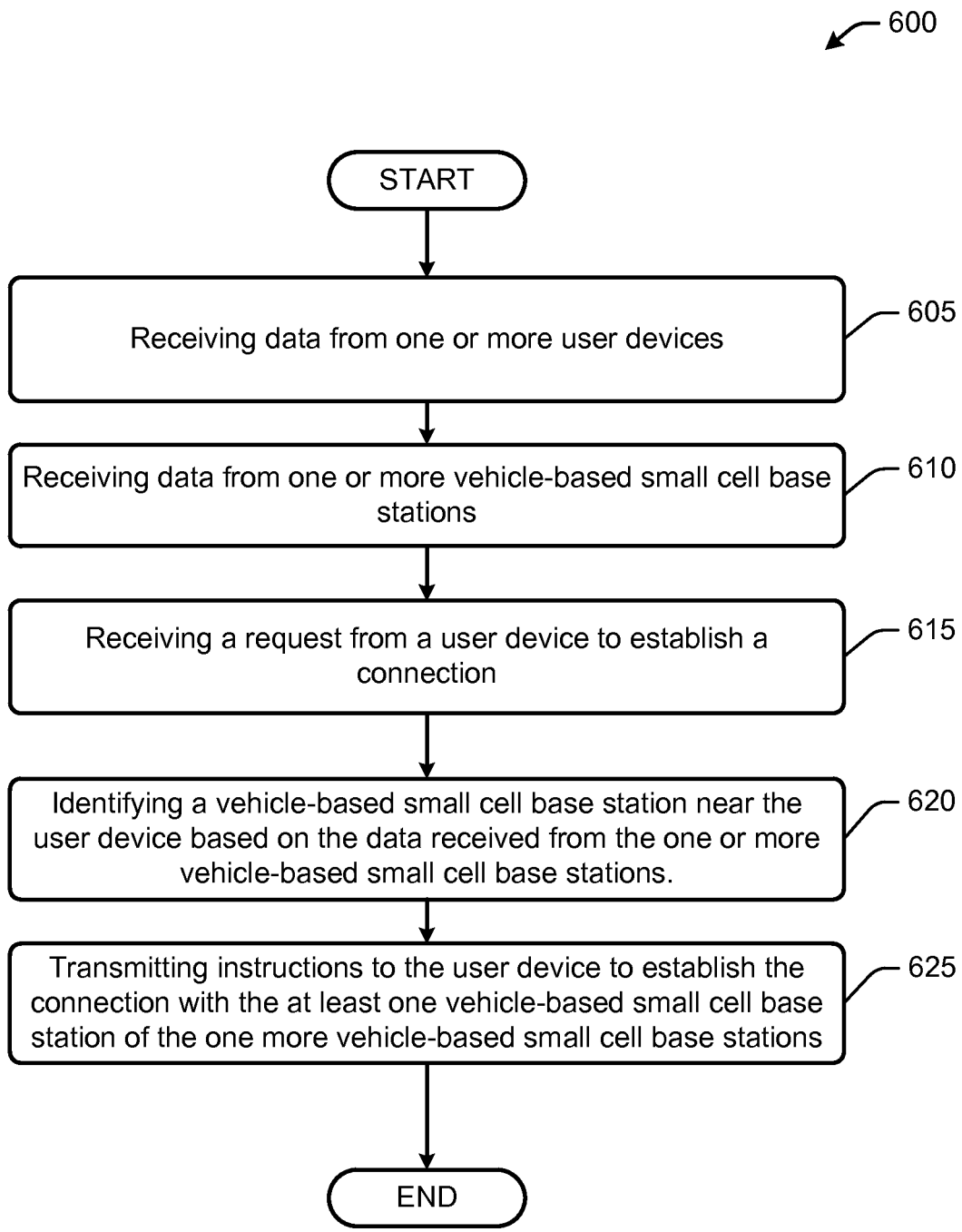
FIG. 6 illustrates a flow diagram of an example process for a macrocell base station in a cellular network infrastructure that includes vehicle-based small cell base stations, in accordance with one or more embodiments of the disclosure.

FIG. 6 illustrates a flow diagram of an example process for a macrocell base station 110 in a cellular network infrastructure that includes vehicle-based small cells base stations 106, in accordance with one or more embodiments of the disclosure. At block 605, the macrocell base station 110 may receive data from one or more user devices 102. In some embodiments, the data from the one or more user devices 102 may include a current location of each of the one or more user devices 102, type of data requested by each of the one or more user devices 102, user preferences associated each of the one or more user devices 102, or the like. In some embodiments, this block may be optional. For example, if connection managements are handled by the vehicle-based small cell base station 106, then the macrocell base station 110 may not receive information from the user devices. Instead, the data from the one or more user devices 102 may be transmitted to the vehicle-based small cell base station 106.

At block 610, the macrocell base station 110 may receive data from one or more vehicle-based small cells base stations 106. In some embodiments, the data received from the one or more vehicle-based small cells base stations 106 may include location data associated with each of the one or more vehicle-based small cells base stations 106, type of vehicle-based small cell base station 106, current connections associated with the vehicle-based small cell base station 106, and the like. In some embodiments, the macrocell base station 110 may identify a second vehicle-based small cell base station 106 of the one or more vehicle-based small cell base stations 106 based at least in part on the data received from the one or more vehicle-based small cell base stations 106. The macrocell base station 110 may transmit instructions to the second vehicle-based small cell base station 106 to establish a connection with the at least one vehicle-based small cell base station 106 of the one or more vehicle-based small cell base stations 106.

At block 615, the macrocell base station 110 may receive a request from a network connection agent 218 of a user device 102 to establish a connection. The request may include information associated with the user device 102, location of the user device 102, type of user device 102, type of data requested by the user device 102, and the like. The request from the user device 102 may include user preferences associated with the user device 102 or a user profile associated with the user device 102. The macrocell base station 110 may obtain content based at least in part on the request, user preferences, user history, the user profile or the like. In some embodiments, the macrocell base station 110 may obtain content from a content network. The macrocell base station 110 may transmit the content to the identified vehicle-based small cell base station 106 for the vehicle-based small cell base station 106 to pre-cache.

At block 620, the macrocell base station 110 may identify a vehicle-based small cell base station 106 of the one or more vehicle-based small cell base stations 106 near the user device 102 based at least in part on the data received from the one or more vehicle-based small cell base stations 106. For example, the connection scheduler 240 of the macrocell base station 110 may identify a vehicle-based small cell base station 106 based on location of the user device 102, location of the vehicle-based small cell base station 106, current connections associated with the vehicle-based small cell base station 106, type of content requested by the user device 102, or other parameters based on information received from the user device 102 and/or vehicle-based small cell base station 106. In some embodiments, the macrocell base station 110 may associate the user device 102 with at least one vehicle-based small cell base station 106 of the one or more vehicle-based small cell base stations 106. In some embodiments, the macrocell base station 110 may transmit instructions to the user device 102 and/or vehicle-based small cell base station 106 to establish a connection with the associated at least one vehicle-based small cell 106.

At block 625, the macrocell base station 110 may transmit data associated with the identified vehicle-based small cell base station 106 to the user device 102 and/or may transmit data associated with the identified vehicle-based small cell base station 106 to the vehicle-based small cell base station 106. In some embodiments, the macrocell base station 110 may receive from the user device 102 an indication that a connection has been established with the identified vehicle-based small cell base station 106. In some embodiments, the macrocell base station 110 may determine that the connection of the user device 102 with the identified vehicle-based small cell base station 106 is diminishing, based on slower transfer rates of data, diminished signal strength between the user device 102 and the identified vehicle-based small cell base station 106, or the like. The macrocell base station 110 may identify a second vehicle-based small cell base station 106 near the user device 102 and associate the user device 102 with the identified second vehicle-based small cell base station 106. The macrocell base station 110 may transmit instructions to the user device 102 to establish a second connection with the identified second vehicle-based small cell base station 106.

In some embodiments, the identified vehicle-based small cell base station 106 may determine the connection with the user device 102 is diminishing and identify or detect a second vehicle-based small cell base station 106. The identified vehicle-based small cell base station 106 may transmit instructions to the user device 102 to establish a second connection with the identified second vehicle-based small cell base station 106.

In one embodiment, a vehicle-based base station may include at least one antenna; at least one transceiver coupled to the at least one antenna; at least one memory that stores computer-executable instructions; and at least one processor in communication with the transceiver and configured to access the at least one memory. The at least one processor may be configured to execute the computer-executable instructions to receive data associated with a user device from a base station; receive content from the base station; establish a connection with the user device based at least in part on the data received from the macrocell base station; and transmit the content received from the base station to the user device.

In one aspect of an embodiment, the data associated with the user device may further include location information of the user device, type of content requested by the user device, or user preferences associated with the user device.

In one aspect of an embodiment, the data associated with the user device may further include authentication credentials associated with the user device, and wherein the at least one processor is further configured to execute the computer-executable instructions to authenticate the user device based at least in part on the authentication credentials.

In one aspect of an embodiment, the at least one processor may be further configured to execute the computer-executable instructions to determine to establish the connection with the user device based at least in part on the data received from the base station.

In one aspect of an embodiment, the content received from the base station may be received and pre-cached prior to establishing the connection with the user device.

In one aspect of an embodiment, the at least one processor may be further configured to execute the computer-executable instructions to receive location data associated with the user device from the user device or the base station; identify a second vehicle-based base station; facilitate a handoff of the connection to the second vehicle-based base station based at least in part the location data associated with the user device.

In another embodiment, a computer program product may be provided. The computer program product residing on a computer readable medium having a plurality of instructions stored thereon, which when executed by a processor, cause the processor to perform operations comprising transmitting a request for content to a macrocell base station; receiving data from the macrocell base station identifying a vehicle-based base station; establishing a connection with the vehicle-based base station based at least in part on the data from the macrocell base station; receiving at least a portion of the content from the vehicle-based base station.

In one aspect of an embodiment, the data from the macrocell base station may further include data indicating a pre-association of the vehicle-based base station and the user device determined by the macrocell base station; and instructions for the user device to establish a connection with the vehicle-based base station.

In one aspect of an embodiment, the operations may further include receiving data from the macrocell base station identifying a plurality of vehicle-based base stations, wherein the plurality of vehicle-based base stations comprise the vehicle-based base station; and determining, based at least in part on the plurality of vehicle-based base stations, that the vehicle-based base station comprises a channel with the highest throughput.

In one aspect of an embodiment, the operations may further include receiving data from the macrocell base station identifying a second vehicle-based base station; establishing a second connection with the second vehicle-based base station; and receiving at least a portion of the content from the second vehicle-based base station.

In one aspect of an embodiment, the request to the macrocell base station may further include at least one of user preferences associated with a user of the user device or a user profile associated with the user of the user device.

In one aspect of an embodiment, the operations may further include transmitting authentication credentials to at least one of the macrocell base station or the vehicle-based base station.

In another embodiment, a macrocell base station may be provided. The macrocell base station may include at least one memory that stores computer-executable instructions; and at least one processor configured to access the at least one memory, wherein the at least one processor is configured to execute the computer-executable instructions to receive data from one or more user devices; receive data from one or more vehicle-based base stations; receive a request from a user device of the one or more user devices to establish a connection; identify a vehicle-based base station of the one or more vehicle-based base stations based at least in part on the data received from at least one of the one or more vehicle-based base stations or the one or more user devices; and transmit data associated with the identified vehicle-based base station to the user device.

In one aspect of an embodiment, the request from the user device may further include user preferences associated with the user device or a user profile associated with the user device.

In one aspect of an embodiment, the at least one processor may be further configured to execute the computer-executable instructions to obtain content based at least in part on the user preferences or the user profile; and transmit the content to the identified vehicle-based base station for the vehicle-based base station to pre-cache.

In one aspect of an embodiment, the data received from the one or more vehicle-based base stations may comprise location data associated with each of the one or more vehicle-based base stations, and the at least one processor may be further configured to execute the computer-executable instructions to identify a second vehicle-based base station of the one or more vehicle-based base stations based at least in part on location data associated with each of the one or more vehicle-based base stations; and transmit instructions to the second vehicle-based base station to establish a connection with the at least one vehicle-based base station of the one or more vehicle-based base stations.

In one aspect of an embodiment, the at least one processor may be further configured to execute the computer-executable instructions to associate the user device with at least one vehicle-based base station of the one or more vehicle-based base stations; and transmit instructions to the user device to establish a connection with the associated at least one vehicle-based base station.

In one aspect of an embodiment, the at least one processor may be further configured to execute the computer-executable instructions to receive from the user device an indication that a connection has been established with the identified vehicle-based base station.

In one aspect of an embodiment, the at least one processor may be further configured to execute the computer-executable instructions to determine that the connection of the user device with the identified vehicle-based base station is diminished; identify a second vehicle-based base station near the user device; associate the user device with the identified second vehicle-based base station; and transmit instructions to the user device to establish a second connection with the identified second vehicle-based base station.

In one aspect of an embodiment, the data from the one or more user devices may further comprise a current location of each of the one or more user devices, type of data requested by each of the one or more user devices, or user preferences associated with each of the one or more user devices.

In another embodiment, a method may be provided. The method may include receiving, by a vehicle-based base station comprising one or more processors, data associated with a user device from a base station. The vehicle-based base station may receive content from the base station. The vehicle-based base station may establish a connection with the user device based at least in part on the data received from the base station. The vehicle-based base station may transmit the content received from the base station to the user device.

In one aspect of an embodiment, the data associated with the user device may further comprise location information of the user device, type of content requested by the user device, or user preferences associated with the user device.

In one aspect of an embodiment, the data associated with the user device may further comprise authentication credentials associated with the user device, and the method may further comprise authenticating, by the vehicle-based base station, the user device based at least in part on the authentication credentials.

In one aspect of an embodiment, the vehicle-based base station may determine to establish the connection with the user device based at least in part on the data received from the base station.

In one aspect of an embodiment, the content received from the base station may be received and pre-cached prior to establishing the connection with the user device.

In one aspect of an embodiment, the method may further comprise receiving, by the vehicle-based base station, location data associated with the user device from the user device or the base station; identifying, by the vehicle-based base station, a second vehicle-based base station; and facilitating, by the vehicle-based base station, a handoff of the connection to the second vehicle-based base station based at least in part the location data associated with the user device.

In another embodiment, a system may be provided. The system may include a means for receiving data associated with a user device from a base station; a means for receiving content from the base station; a means for establishing a connection with the user device based at least in part on the data received from the base station; and a means for transmitting the content received from the base station to the user device.

In one aspect of an embodiment, the data associated with the user device may further comprise location information of the user device, type of content requested by the user device, or user preferences associated with the user device.

In one aspect of an embodiment, the data associated with the user device may further comprise authentication credentials associated with the user device, and the system may further comprise a means for authenticating the user device based at least in part on the authentication credentials.

In one aspect of an embodiment, the system may further comprise a means for determining to establish the connection with the user device based at least in part on the data received from the base station.

In one aspect of an embodiment, the content received from the base station may be received and pre-cached prior to establishing the connection with the user device.

In one aspect of an embodiment, the system may further comprise a means for receiving location data associated with the user device from the user device or the base station; a means for identifying a second vehicle-based base station; a means for facilitating a handoff of the connection to the second vehicle-based base station based at least in part the location data associated with the user device.

In another embodiment, a system may be provided. The system may include a means for transmitting a request to a macrocell base station; a means for receiving data from the macrocell base station identifying a vehicle-based base station; a means for establishing a connection with the vehicle-based base station based at least in part on the data from the macrocell base station; and a means for receiving at least a portion of the content from the vehicle-based base station.

In one aspect of an embodiment, the data from the macrocell base station may further comprise data indicating a pre-association of the vehicle-based base station and the user device determined by the macrocell base station; and instructions for the user device to establish a connection with the vehicle-based base station.

In one aspect of an embodiment, the system may further comprise a means for receiving data from the macrocell base station identifying a plurality of vehicle-based base stations, wherein the plurality of vehicle-based base stations comprise the vehicle-based base station; and a means for determining, based at least in part on the plurality of vehicle-based base stations, that the vehicle-based base station comprises a channel with the highest throughput.

In one aspect of an embodiment, the system may further comprise a means for receiving data from the macrocell base station identifying a second vehicle-based base station; a means for establishing a second connection with the second vehicle-based base station; and a means for receiving at least a portion of the content from the second vehicle-based base station.

In one aspect of an embodiment, the request to the macrocell base station may further comprise at least one of user preferences associated with a user of the user device or a user profile associated with the user of the user device.

In one aspect of an embodiment, the system may further comprise a means for transmitting authentication credentials to at least one of the macrocell base station or the vehicle-based base station.

In another embodiment, a non-transitory computer-readable medium may be provided. The non-transitory computer-readable medium may comprise instructions, that when execute by at least one processor, causes the at least one processor to transmit a request to a macrocell base station; receive data from the macrocell base station identifying a vehicle-based base station; establish a connection with the vehicle-based base station based at least in part on the data from the macrocell base station; and receive content from the vehicle-based base station.

In one aspect of an embodiment, the data from the macrocell base station may further comprise data indicating a pre-association of the vehicle-based base station and the user device determined by the macrocell base station; and instructions for the user device to establish a connection with the vehicle-based base station.

In one aspect of an embodiment, the instructions may further cause the at least one processor to receive data from the macrocell base station identifying a plurality of vehicle-based base stations, wherein the plurality of vehicle-based base stations comprise the vehicle-based base station; and determine, based at least in part on the plurality of vehicle-based base stations, that the vehicle-based base station comprises a channel with the highest throughput.

In one aspect of an embodiment, the instructions may further cause the at least one processor to receive data from the macrocell base station identifying a second vehicle-based base station; establish a second connection with the second vehicle-based base station; and receive at least a portion of the content from the second vehicle-based base station.

In one aspect of an embodiment, the request to the macrocell base station may further comprise at least one of user preferences associated with a user of the user device or a user profile associated with the user of the user device.

In one aspect of an embodiment, the instructions may further cause the at least one processor to transmit authentication credentials to at least one of the macrocell base station or the vehicle-based base station.

In another embodiment, a method may be provided. The method may comprise receiving, by a macrocell base station comprising one or more processors, data from one or more user devices; receiving, by the macrocell base station, data from one or more vehicle-based base stations; receiving, by the macrocell base station, a request from a user device of the one or more user devices to establish a connection; identifying, by the macrocell base station, a vehicle-based base station of the one or more vehicle-based base stations near the user device based at least in part on the data received from at least one of the one or more vehicle-based base stations or the one or more user devices; and transmitting, by the macrocell base station, data associated with the identified vehicle-based base station to the user device.

In one aspect of an embodiment, the request from the user device may further comprise user preferences associated with the user device or a user profile associated with the user device.

In one aspect of an embodiment, the method may further comprise obtaining, by the macrocell base station, content based at least in part on the user preferences or the user profile; and transmitting, by the macrocell base station, the content to the identified vehicle-based base station for the vehicle-based base station to pre-cache.

In one aspect of an embodiment, the data received from the one or more vehicle-based base stations may comprise location data associated with each of the one or more vehicle-based base stations, and the method may further comprise identifying, by the macrocell base station, a second vehicle-based base station of the one or more vehicle-based base stations based at least in part on location data associated with each of the one or more vehicle-based base stations; and transmitting, by the macrocell base station, instructions to the second vehicle-based base station to establish a connection with the at least one vehicle-based base station of the one or more vehicle-based base stations.

In one aspect of an embodiment, the method may further comprise associating, by the macrocell base station, the user device with at least one vehicle-based base station of the one or more vehicle-based base stations; and transmitting, by the macrocell base station, instructions to the user device to establish a connection with the associated at least one vehicle-based base station.

In one aspect of an embodiment, the method may further comprise receiving, by the macrocell base station, from the user device an indication that a connection has been established with the identified vehicle-based base station.

In one aspect of an embodiment, the method may further comprise determining, by the macrocell base station, that the connection of the user device with the identified vehicle-based base station is diminished; identifying, by the macrocell base station, a second vehicle-based base station near the user device; associating, by the macrocell base station, the user device with the identified second vehicle-based base station; and transmitting, by the macrocell base station, instructions to the user device to establish a second connection with the identified second vehicle-based base station.

In one aspect of an embodiment, the data from the one or more user devices may further comprise a current location of each of the one or more user devices, type of data requested by each of the one or more user devices, or user preferences associated each of the one or more user devices.

In another embodiment, a system may be provided. The system may comprise a means for receiving data from one or more user devices; a means for receiving data from one or more vehicle-based base stations; a means for receiving a request from a user device of the one or more user devices to establish a connection; a means for identifying a vehicle-based base station of the one or more vehicle-based base stations near the user device based at least in part on the data received from at least one of the one or more vehicle-based base stations or the one or more user devices; and a means for transmitting data associated with the identified vehicle-based base station to the user device.

In one aspect of an embodiment, the request from the user device may further comprise user preferences associated with the user device or a user profile associated with the user device.

In one aspect of an embodiment, the system may further comprise a means for obtaining content based at least in part on the user preferences or the user profile; and a means for transmitting the content to the identified vehicle-based base station for the vehicle-based base station to pre-cache.

In one aspect of an embodiment, the data received from the one or more vehicle-based base stations may comprise location data associated with each of the one or more vehicle-based base stations, and the system may further comprise a means for identifying a second vehicle-based base station of the one or more vehicle-based base stations based at least in part on location data associated with each of the one or more vehicle-based base stations; and a means for transmitting instructions to the second vehicle-based base station to establish a connection with the at least one vehicle-based base station of the one or more vehicle-based base stations.

In one aspect of an embodiment, the system may further comprise a means for associating the user device with at least one vehicle-based base station of the one or more vehicle-based base stations; and a means for transmitting instructions to the user device to establish a connection with the associated at least one vehicle-based base station.

In one aspect of an embodiment, the system may further comprise a means for receiving from the user device an indication that a connection has been established with the identified vehicle-based base station.

In one aspect of an embodiment, the system may further comprise a means for determining that the connection of the user device with the identified vehicle-based base station is diminished; a means for identifying a second vehicle-based base station near the user device; a means for associating the user device with the identified second vehicle-based base station; and a means for transmitting instructions to the user device to establish a second connection with the identified second vehicle-based base station.

In one aspect of an embodiment, the data from the one or more user devices may further comprise a current location of each of the one or more user devices, type of data requested by each of the one or more user devices, or user preferences associated each of the one or more user devices.

CONCLUSION

The above descriptions and examples are for purposes of illustration and are not meant to be limiting. Additional descriptions and examples may exist in other embodiments. For example, at least a portion of the functionality described in association with certain devices may be performed by one or more other devices. In this way, the described functionality may be distributed among one or any number or combination of devices. As another example, different modules for implementing other types of functionality, types of communication, etc., in support of dynamically allocating wireless spectrum and utilizing the wireless spectrum in an operator network may also exist.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation. The patentable scope of certain embodiments of the present disclosure is defined in the claims, and may include other examples that occur to those skilled in the art.

What is claimed is:

1. A vehicle-based base station device, comprising:
at least one antenna;
at least one transceiver coupled to the at least one antenna;
at least one memory that stores computer-executable instructions; and
at least one processor in communication with the transceiver and configured to access the at least one memory, the at least one processor being further configured to execute the computer-executable instructions to:
receive data associated with a user device located within the vehicle from a base station device;
receive content from the base station device;
determine the vehicle-based base station device has a bandwidth capacity to process the data;
establish a connection with the user device based at least in part on the bandwidth capacity;
establish the connection between the vehicle-based base station and the user device;
transmit the content received from the base station device to the user device;
receive location data from the user device or the base station device;
identify a second vehicle-based base station device within a range from the user device; and
facilitate a handoff of the connection from the vehicle-based base station to the second vehicle-based base station device based at least in part the location data.

2. The vehicle-based base station device of claim 1, wherein the data associated with the user device further comprises location information of the user device, type of content requested by the user device, or user preferences associated with the user device.

3. The vehicle-based base station device of claim 1, wherein the data associated with the user device further comprises authentication credentials associated with the user device, and wherein the at least one processor is further configured to execute the computer-executable instructions to
authenticate the user device based at least in part on the authentication credentials.

4. The vehicle-based base station device of claim 1, wherein the at least one processor is further configured to execute the computer-executable instructions to
determine that the capacity provides a defined amount of bandwidth to handle a type of data included in the the data received from the base station.

5. The vehicle-based base station device of claim 1, wherein the content received from the base station device is received and pre-cached prior to establishing the connection with the user device.

6. A non-transitory computer readable medium having instructions stored thereon which, when executed by a processor, cause the processor to perform operations comprising:
causing to transmit a request for content associated with a user device to a macrocell base station device;
receiving data from the macrocell base station device identifying vehicle-based base station devices, determining a vehicle-based base station device of the vehicle-based base station devices;
causing to establish a connection with the vehicle-based base station device based at least in part on the data received from the macrocell base station device;
receiving at least one portion of the content from the macrocell base station device;
transmitting the at least one portion of the content to the user device;
receiving location data from the user device;
identifying a second vehicle-based base station device of the vehicle-based base station devices within a range from the user device; and
facilitating a handoff of the connection from the vehicle-based base station to the second vehicle-based base station device based at least in part the location data.

7. The non-transitory computer readable medium of claim 6, wherein the data from the macrocell base station device further comprises data indicating a pre-association of the vehicle-based base station device and the macrocell base station device; and instructions for the user device to establish a connection with the vehicle-based base station device.

8. The non-transitory computer readable medium of claim 6, wherein the determining the vehicle-based base station device comprises comparing respective throughputs of respective channels associated with the vehicle-based base stations; and
selecting the vehicle-based base station having the channel with the highest throughout.

9. The non-transitory computer readable medium of claim 6, the operations further comprising
receiving data from the macrocell base station identifying a second vehicle-based base station;
establishing a second connection with the second vehicle-based base station; and
receiving at least a second portion of the content from the second vehicle-based base station device.

10. The non-transitory computer readable medium of claim 6, wherein the request to the macrocell base station device further comprises at least one of user preferences associated with a user of the user device or a user profile associated with the user of the user device.

11. The non-transitory computer readable medium of claim 6, the operations further comprising transmitting authentication credentials to at least one of the macrocell base station device or the vehicle-based base station device.

12. A macrocell base station device, comprising:

at least one memory that stores computer-executable instructions; and at least one processor configured to access the at least one memory, wherein the at least one processor is further configured to execute the computer-executable instructions to:

receive data from one or more vehicle-based base station devices;

receive a request from a user device to establish a connection with at least one of the one or more vehicle-based base station devices;

identify a vehicle-based base station device of the one or more vehicle-based base station devices based at least in part on second data received from the at least one of the one or more vehicle-based base station devices;

transmit data associated with the identified vehicle-based base station device to the user device;

receive location data from the user device;

identify a second vehicle-based base station device of the vehicle-based base station devices within a range from the user device; and facilitate a handoff of the connection from the vehicle-based base station to the second vehicle-based base station device based at least in part the location data.

13. The macrocell base station device of claim 12, wherein the request from the user device further comprises user preferences associated with the user device or a user profile associated with the user device.

14. The macrocell base station device of claim 13, wherein the at least one processor is further configured to execute the computer-executable instructions to:

obtain content based at least in part on the user preferences or the user profile; and transmit the content to the identified vehicle-based base station device for the vehicle-based base station device to pre-cache.

15. The macrocell base station device of claim 12, wherein the data received from the one or more vehicle-based base station device comprises location data associated with each of the one or more vehicle-based base station device, and wherein the at least one processor is further configured to execute the computer-executable instructions to:

identify a second vehicle-based base station device of the one or more vehicle-based base station devices based at least in part on location data associated with each of the one or more vehicle-based base station devices; and transmit instructions to the second vehicle-based base station device to establish a connection with the at least one vehicle-based base station device of the one or more vehicle-based base station devices.

16. The macrocell base station device of claim 12, wherein the at least one processor is further configured to execute the computer-executable instructions to:

associate the user device with at least one vehicle-based base station device of the one or more vehicle-based base station devices; and transmit instructions to the user device to establish a connection with the associated at least one vehicle-based base station device.

17. The macrocell base station device of claim 12, wherein the at least one processor is further configured to execute the computer-executable instructions to receive from the user device an indication that a connection has been established with the identified vehicle-based base station device.

18. The macrocell base station device of claim 17, wherein the at least one processor is further configured to execute the computer-executable instructions to:

determine that the connection of the user device with the identified vehicle-based base station device is diminished;

identify a second vehicle-based base station device near the user device;

associate the user device with the identified second vehicle-based base station device; and transmit instructions to the user device to establish a second connection with the identified second vehicle-based base station device.

19. The macrocell base station device of claim 12, wherein the at least one processor is further configured to execute the computer-executable instructions to:

receive third data from one or more user devices including the user device, the second data comprising a current location of each of the one or more user devices, type of data requested by each of the one or more user devices, or user preferences associated with each of the one or more user devices; and determine a second vehicle-based base station device of the one or more vehicle-based base station devices based at least in part on the second data.

* * * * *